United States Patent [19]
Kamiya

[11] Patent Number: 6,005,843
[45] Date of Patent: Dec. 21, 1999

[54] VIRTUAL SOURCE/VIRTUAL DESTINATION DEVICE OF ASYNCHRONOUS TRANSFER MODE NETWORK

[75] Inventor: Satoshi Kamiya, Tokyo, Japan

[73] Assignee: Nec Corporation, Tokyo, Japan

[21] Appl. No.: 08/896,026

[22] Filed: Jul. 17, 1997

[30] Foreign Application Priority Data

Jul. 19, 1996 [JP] Japan .................................... 8-190594

[51] Int. Cl.⁶ ............................ G06F 11/00; G08C 15/00
[52] U.S. Cl. .......................... 370/231; 370/236; 370/395
[58] Field of Search ................................... 370/239, 230, 370/231, 232, 235, 236, 252, 253, 233, 234, 395; 709/232, 233, 234, 235

[56] References Cited

U.S. PATENT DOCUMENTS

| | | | |
|---|---|---|---|
| 5,090,011 | 2/1992 | Fukuta et al. | 370/230 |
| 5,677,903 | 10/1997 | Hayter et al. | 370/235 |
| 5,694,390 | 12/1997 | Yamato et al. | 370/236 |
| 5,787,073 | 7/1998 | Ikeda | 370/236 |

FOREIGN PATENT DOCUMENTS 7-297843  10/1995  Japan .

OTHER PUBLICATIONS

The ATM Forum Technical committee; *Traffic management Specification*, Version 4.0; af–tm–0056.000 Apr. 1996.

Yo Shimizu et al. "ATM–LAN," Software Research Center, pp. 122–127 (Feb. 10, 1995).

*Primary Examiner*—Alpus H. Hsu
*Assistant Examiner*—Afsar M. Qureshi
*Attorney, Agent, or Firm*—Foley & Lardner

[57] ABSTRACT

A virtual source/virtual destination device including a BRM information extracting unit for extracting rate information and congestion information from a resource management cell transmitted in a closed loop control section on the destination side, a BRM information determining unit for determining rate information and congestion information to be notified to a closed loop control section on the source side based on the rate information and said congestion information at the closed loop control section on the destination side extracted by the BRM information extracting unit, and a VS module for writing the rate information and the congestion information determined by the BRM information determining unit to a resource management cell to be sent to the closed loop control section on the source side.

8 Claims, 6 Drawing Sheets

VIRTUAL SOURCE/VIRTUAL DESTINATION DEVICE OF ASYNCHRONOUS TRANSFER MODE NETWORK

BACKGROUND OF THE INVENTION

1. Field of the Invention

The present invention relates to a virtual source/virtual destination device in an asynchronous transfer mode (ATM) network and, more particularly, to a virtual source/virtual destination device which notifies a device located upstream on a signal flow of a rate and a congestion state, in an ATM network where available bit rate (ABR) service is provided for managing a band using a resource management cell (RM cell).

2. Description of the Related Art

As the service on an ATM network, ABR service has been recommended in these days. Such recommendation is recited, for example, in "ATM Forum Traffic Management Specification version 4.0" (The ATM Forum Technical Committee, April 1996). ABR service is the service intended to guarantee not transmission quality against a data transmission delay but quality against data abandonment. In other words, the service guarantees accurate transmission of data contents even when sacrificing an outgoing cell rate. In thus characterized ABR service, an allowable cell rate (ACR), which is an outgoing cell rate at an end-system, is controlled by closed loop control using a resource management cell (RM cell).

FIG. 5 is a block diagram showing concept of a conventional ATM network associated with the above-described ABR service. With reference to FIG. 5, connected to an ATM network 101 is a source 10 and a destination 20, in which an ATM switch 102 is disposed.

For the data transmission by the source 10 to the destination 20, the source 10 first sends out a forward resource management cell (FRM cell). Upon reception of the FRM cell which has sent from the source 10 and then passed through the ATM switch 102, the destination 20 returns the FRM cell as a backward resource management cell (BRM cell) to the source 10.

At the time when the FRM cell sent from the source 10 or the BRM cell sent from the destination 20 passes through the ATM switch 102, the switch writes to the FRM cell or the BRM cell, an explicit rate (ER), a congestion indication bit (CI bit) and a no increase bit (NI bit) which are information on a congestion state at that time. ER is a rate which indicates that no congestion occurs when the ATM switch is at a rate less than or equal to this rate. CI bit indicates congestion when its value is "1" and indicates non-congestion when it is "0". NI bit indicates no rate increase when its value is "1" and rate increase allowed when it is "0". The source 10 modifies an outgoing cell rate based on the ER, the CI bit and the NI bit written on the BRM cell sent from the destination 20.

ACR transmittable from the source 10 is controlled based on the rate information and the congestion information written on a turning-around RM cell. Large distance between the source 10 and the destination 20 and a long round trip time (RTT) therefore result in increase in a congestion control loop using an RM cell.

As a result, it will take a longer time for the congestion information written on the RM cell by the ATM switch 102 to arrive at the source 10, whereby rate control performance of the source 10 is degraded. In addition, since it is not before an FRM cell sent out first from the source 10 returns to the source 10 as a BRM cell that rate control by an RM cell starts operating, no improvement is made in data transfer efficiency at the start of data transmission.

For the purpose of solving the above problems, ABR service defines a virtual source/virtual destination (VS/VD) device as recited in the above-described literature, for example. VS/VD is provided halfway in the network to virtually assume a terminal behavior for conducting RM cell termination processing. Introduction of a VS/VD device into the ABR service network results in dividing a congestion control loop using an RM cell to shorten an arrival time of congestion information at the source 10, thereby improving rate control performance by the source 10. In the following description, a unit of such a divided congestion control loop is referred to as a segment.

FIG. 6 is a block diagram showing one example of an ATM network associated with ABR service in which a congestion control loop is divided into a plurality of segments by a conventional VS/VD device. In the illustrated example, the ABR service network has a congestion control loop divided into three segments 104a, 104b and 104c by VS/VDs 103a and 103b. In the following description, the side of a source 10 is referred to as being upstream and the side of a destination 20 as being downstream.

In FIG. 6, in data transmission from the source 10 to the destination 20, an FRM cell sent out by the source 10 is terminated by the VS/VD 103a and returned to the source 10 as an BRM cell. Also between the VS/VD 103a and the VS/VD 103b and between the VS/VD 103b and the destination 20, an RM cell similarly turns around within each segment. The VS/VD congestion indication system in the illustrated example is to indicate congestion, at the time when a cell buffer in the VS/VD congests, by applying the congestion indication to an RM cell turning around in an upstream segment.

The above-described conventional VS/VD device, however, has a shortcoming that rate information and congestion information written in an RM cell is neither received nor transmitted directly over divisional segments.

In FIG. 6, when congestion occurs at a switch in the downstream segment 104c, a BRM cell which stores the congestion information is terminated by the VS/VD 103b and therefore fails to arrive at the upstream segments 104b and 104a. While the VS/VD 103b reduces an ACR trasmittable to the destination 20 from the VS/VD 103b according to the contents of the BRM cell which stores the congestion information of the downstream segment 104c, an ACR from the upstream VS/VD 103a remains unchanged, so that a cell buffer of the VS/VD 103b congests. Therefore, the VS/VD 103b, upon occurrence of congestion of a cell buffer in its device, for the first time stores congestion information in the BRM cell to notify the VS/VD 103a, causing the VS/VD 103a to reduce the ACR to the VS/VD 103b.

Furthermore, reduction of an outgoing cell rate at the VS/VD 103a to the VS/VD 103b causes congestion at a cell buffer of the VS/VD 103a similarly to the generation of congestion in the cell buffer of the VS/VD 103b as mentioned above. Then, following the same procedure, a congestion indication arrives at the source 10.

As described in the foregoing, congestion control by a conventional VS/VD device has a shortcoming that when congestion occurs at any segment on a network, buffers of all the VS/VD devices existing halfway between connections congest before a congestion indication arrives at a source to reduce an outgoing cell rate at the source.

Another shortcoming is that since congestion indication and rate information indicative of a downstream congestion state do not arrive at the source until all the buffers of the VS/VDs existing halfway between connections congest, the congestion indication and notification of the rate information to the source takes much time to delay elimination of the congestion.

One of conventional ATM communication devices providing ABR service traffic is disclosed, for example, in Japanese Patent Laying-Open (Kokai) No. Heisei 7-297843, entitled "ATM Communication Device". The literature recites an ATM communication device with dynamic bandwidth allocation (DBA) comprising an accumulation device associated with DBA traffic including an accumulation device directed to ABR traffic, an device to which an ABR bandwidth request is allocated after all the remaining DBA bandwidth allocation is satisfied, and a device which interrupts, for the purpose of transmitting DBA traffic with higher priority than the others, said ABR transmission before band allocation including the ABR transmission is fully used. While the literature refers to an end-system and a switching system capable of handling traffic of ABR service, it refers nothing about a VS/VD device. It is therefore impossible to solve the problem concerning congestion indication at an ATM network into which the above-described VS/VD device is introduced.

SUMMARY OF THE INVENTION

An object of the present invention is to provide a virtual source/virtual destination device capable of quickly notifying a source of congestion occurring downstream in an ATM network to enable early elimination of the congestion.

Another object of the present invention is to provide a virtual source/virtual destination device capable of absorbing minute rate variation to prevent sensitive change of an outgoing cell rate at a source, thereby improving efficiency in use of a band of an available bit rate.

A further object of the present invention is to provide a virtual source/virtual destination device which processes collected rate information and congestion information when traffic of service class such as CBR or VBR other than ABR exists in the same link, thereby avoiding or eliminating congestion of a cell buffer caused due to variation of traffic of the service class.

According to one aspect of the invention, a virtual source/ virtual destination device arranged between a source and a destination in an asynchronous transfer mode network where available bit rate service is provided, for dividing a closed loop control section between the source and the destination into a plurality of small closed loop control sections and virtually assuming a terminal behavior in the small closed loop control section to conduct termination processing of a resource management cell, comprises destination side information extracting means for extracting rate information and congestion information from a resource management cell transmitted in a closed loop control section on said destination side, information determining means for determining rate information and congestion information to be notified to a closed loop control section on said source side based on said rate information and said congestion information at the closed loop control section on said destination side extracted by said destination side information extracting means, and writing means for writing said rate information and said congestion information determined by said information determining means to a resource management cell to be sent to the closed loop control section on said source side.

The virtual source/virtual destination device may further comprise own device information obtaining means for obtaining rate information and congestion information at own device regarding a data cell received from the closed loop control section on said source side, wherein said information determining means determines rate information and congestion information to be indicated to the closed loop control section on said source side based on said rate information and said congestion information in the closed loop control section on said destination side extracted by said destination side information extracting means and the rate information and the congestion information at its own device obtained by said own device information obtaining means.

The virtual source/virtual destination device may further comprise source side information extracting means for extracting rate information and congestion information from a resource management cell transmitted in the closed loop control section on said source side, and own device information obtaining means for obtaining rate information and congestion information at its own device regarding a data cell received from the closed loop control section on said source side, wherein said information determining means determines rate information and congestion information to be indicated to the closed loop control section on said source side based on said rate information and said congestion information in the closed loop control section on said destination side extracted by said destination side information extracting means, said rate information and said congestion information in the closed loop control section on said source side extracted by said source side information extracting means, and the rate information and the congestion information at its own device obtained by said own device information obtaining means.

In the preferred construction, the information determining means may compare said rate information and said congestion information in the closed loop control section on said destination side referred to for determining rate information and congestion information with said rate information and said congestion information in the closed loop control section on said destination side referred to at the time of the last determination of rate information and congestion information to determine rate information and congestion information to be indicated to the closed loop control section on said source side according to increase or decrease in value.

In the preferred construction, the information determining means compares said rate information in the closed loop control section on said destination side referred to for determining rate information with said rate information in the closed loop control section on said destination side referred to at the time of the last determination of rate information, when the value of said rate information is reduced and a reduction rate is higher than a preset value, determines rate information based on present said rate information in the closed loop control section on said destination side, when the value of said rate information is reduced and a reduction rate is lower than the preset value, determines rate information based on said rate information in the closed loop control section on said destination side referred to at the time of the last determination of rate information, and when the value of said rate information is increased, determines rate information based on said rate information in the closed loop control section on said destination side.

In another preferred construction, the virtual source/virtual destination device may further comprise own device information obtaining means for obtaining rate information and congestion information at its own device regarding a data cell received from the closed loop control section on said source side, wherein said information determining means compares rate information regarding an arrival rate of a data cell at its own device referred to for determining rate information with rate information regarding an arrival rate of a data cell at its own device referred to at the time of the last determination of rate information, when the value of said rate information is reduced and a reduction rate is higher than a preset value, determines rate information based on present said rate information in the closed loop control section on said destination side, when the value of said rate information is reduced and a reduction rate is lower than the preset value, determines rate information based on said rate information in the closed loop control section on said destination side referred to at the time of the last determination of rate information, and when the value of said rate information is increased, determines rate information based on present said rate information in the closed loop control section on said destination side.

The information determining means compares said rate information in the closed loop control section on said destination side referred to for determining rate information with said rate information in the closed loop control section on said destination side referred to at the time of several times of determination of past rate information, when the value of said rate information continues being decreased and a rate of change in the reduction rate is higher than a preset value, determines rate information based on present said rate information in the closed loop control section on said destination side, and when the value of said rate information continues being decreased and a rate of change in the reduction rate is lower than the preset value, determines rate information based on present said rate information in the closed loop control section on said destination side.

The information determining means when said congestion information in the closed loop control section on said destination side indicates a congestion state a preset number of times in succession, sets congestion information to be notified to the closed loop control section on said source side to have the contents indicative of a congestion state, and when said congestion information in the closed loop control section on said destination side indicates a non-congestion state a preset number of times in succession, sets congestion information to be notified to the closed loop control section on said source side to have the contents indicative of a non-congestion state.

The virtual source/virtual destination device may further comprise own device information obtaining means for obtaining rate information and congestion information at its own device regarding a data cell received from the closed loop control section on said source side, wherein said information determining means when said congestion information at its own device indicates a congestion state a preset number of times in succession, sets congestion information to be notified to the closed loop control section on said source side to have the contents indicative of a congestion state, and when said congestion information at its own device indicates a non-congestion state a preset number of times in succession, sets congestion information to be notified to the closed loop control section on said source side to have the contents indicative of a noncongestion state.

According to the second aspect of the invention, a virtual source/virtual destination device arranged between a source and a destination in an asynchronous transfer mode network where available bit rate service is provided, for dividing a closed loop control section between the source and the destination into a plurality of small closed loop control sections and virtually assuming a terminal behavior in the small closed loop control section to conduct termination processing of a resource management cell, comprises destination side information extracting means for extracting rate information from a resource management cell transmitted in a closed loop control section on said destination side, information determining means for determining rate information to be notified to a closed loop control section on said source side based on said rate information in the closed loop control section on said destination side extracted by said destination side information extracting means, and writing means for writing said rate information determined by said information determining means to a resource management cell to be sent to the closed loop control section on said source side.

The virtual source/virtual destination device may further comprise own device information obtaining means for obtaining rate information at its own device regarding a data cell received from the closed loop control section on said source side, wherein said information determining means determines rate information to be notified to the closed loop control section on said source side based on said rate information in the closed loop control section on said destination side extracted by said destination side information extracting means and the rate information at its own device obtained by said own device information obtaining means.

The virtual source/virtual destination device may further comprise source side information extracting means for extracting rate information from a resource management cell transmitted in the closed loop control section on said source side, and own device information obtaining means for obtaining rate information at its own device regarding a data cell received from the closed loop control section on said source side, wherein said information determining means determines rate information to be notified to the closed loop control section on said source side based on said rate information in the closed loop control section on said destination side extracted by said destination side information extracting means, said rate information in the closed loop control section on said source side extracted by said source side information extracting means, and the rate information at its own device obtained by said own device information obtaining means.

According to the third aspect of the invention, a virtual source/virtual destination device arranged between a source and a destination in an asynchronous transfer mode network where available bit rate service is provided, for dividing a closed loop control section between the source and the destination into a plurality of small closed loop control sections and virtually assuming a terminal behavior in the small closed loop control section to conduct termination processing of a resource management cell, comprises destination side information extracting means for extracting congestion information from a resource management cell transmitted in a closed loop control section on said destination side, information determining means for determining congestion information to be notified to a closed loop control section on said source side based on said congestion information at the closed loop control section on said destination side extracted by said destination side information extracting means, and writing means for writing said congestion information determined by said information determining means to a resource management cell to be sent to the closed loop control section on said source side.

The virtual source/virtual destination device may further comprise own device information obtaining means for obtaining congestion information at its own device regarding a data cell received from the closed loop control section on said source side, wherein said information determining means determines congestion information to be notified to the closed loop control section on said source side based on said congestion information in the closed loop control section on said destination side extracted by said destination side information extracting means and the congestion information at its own device obtained by said own device information obtaining means.

The virtual source/virtual destination device may further comprise source side information extracting means for extracting congestion information from a resource management cell transmitted in the closed loop control section on said source side, and own device information obtaining means for obtaining congestion information at its own device regarding a data cell received from the closed loop control section on said source side, wherein said information determining means determines congestion information to be notified to the closed loop control section on said source side based on said congestion information in the closed loop control section on said destination side extracted by said destination side information extracting means, said congestion information in the closed loop control section on said source side extracted by said source side information extracting means, and the congestion information at its own device obtained by said own device information obtaining means.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessarily obscure the present invention.

Figure 1:
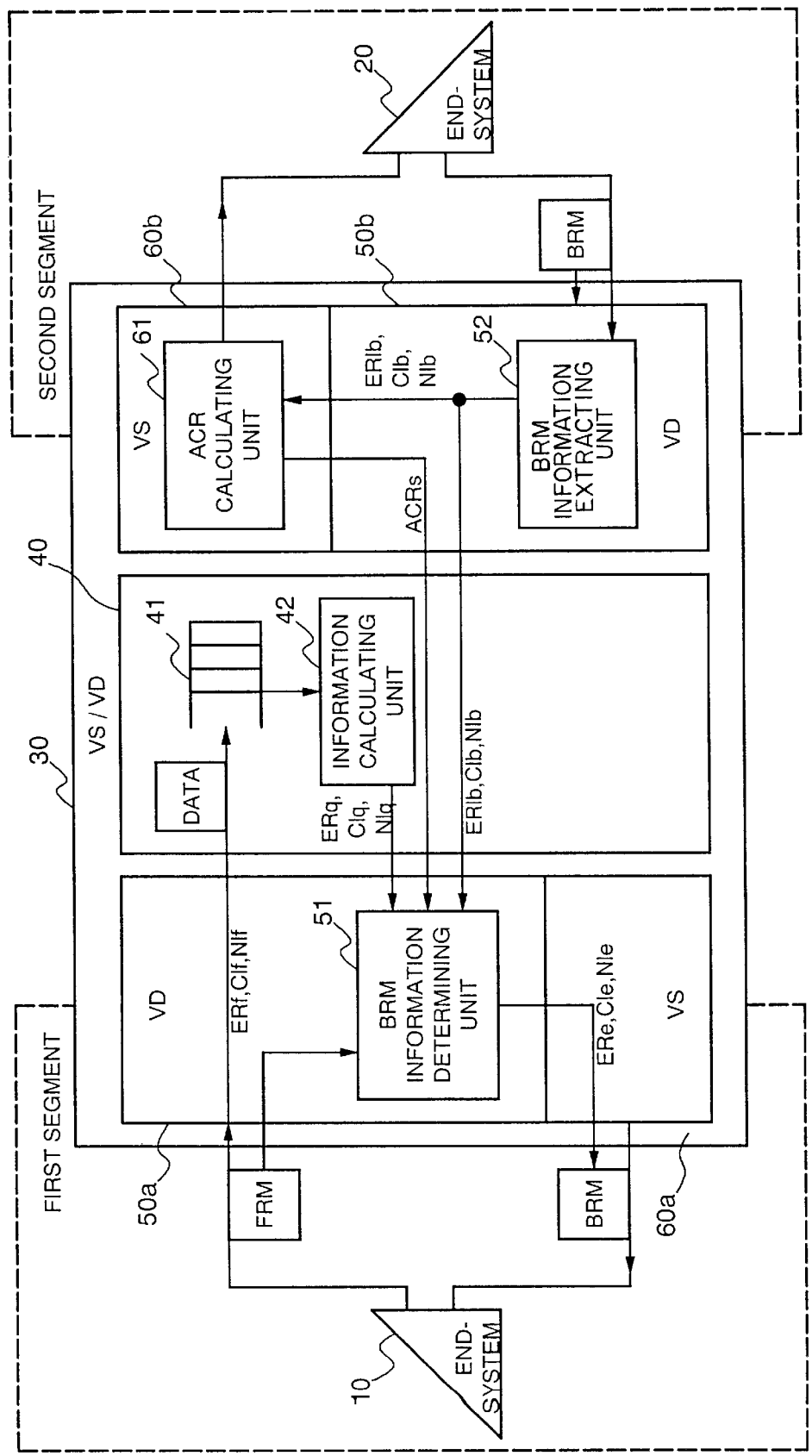
FIG. 1 is a block diagram showing structure of a virtual source/virtual destination device according to one embodiment of the present invention.

FIG. 1 is a block diagram showing structure of a virtual source/virtual destination (VS/VD) device according to one embodiment of the present invention.

As illustrated in the figure, a VS/VD 30 of the present embodiment includes VD modules 50a and 50b (collectively "VS module 50") and VS modules 60a and 60b (collectively "VD module 60") which virtually realize a end-system behavior in ABR service, and a buffer unit 40. The VS module 60 and the VD module 50 realize a end-system behavior in pairs. The end-system behavior is specifically a common operation recited in the above-described literature "ATM Forum Traffic Management Specification Version 4.0". The VS/VD device 30 of the present embodiment conducts a common end-system behavior recited in the above literature, as well as transmitting information regarding congestion occurring at a downstream segment directly to an upstream segment to indicate to a source quickly. In FIG. 1, illustration is made only of a characteristic part of the structure of the present embodiment and that of the remaining common part is omitted.

The VD module 50 includes, as a function executing means for realizing a destination behavior in ABR service, a BRM information extracting unit 52 for receiving a BRM cell sent from an end-system located downstream or other VC/VD device and extracting information in the cell. The VD module 50 further includes a BRM information determining unit 51 for determining information to be applied to a BRM to be returned to an end-system located upstream or other VC/VD device.

The VS module 60 includes, as a function executing means for realizing a source behavior in ABR service, an ACR calculating unit 61 for calculating an ACR for an end-system located downstream or other VC/VD device.

The buffer unit 40 includes a cell buffer 41 for storing connection characteristic information and an information calculating unit 42 for obtaining connection characteristic information from the cell buffer 41 to calculate rate information and congestion information. The connection characteristic information stored in the cell buffer 41 is virtually classified by connections including virtual path (VP), virtual channel (VC), etc. identified by virtual path identifier (VPI), virtual channel identifier (VCI) to form a queue to be managed.

Although for simplicity, illustration in FIG. 1 is made only of a functional block associated with data transmutation from the end-system 10 to the end-system 20, the VS/VD 30 is a device having structure symmetrical to the transmission and reception direction and in practice has the same functional block also associated with a connection which conducts data communication from the end-system 20 to the end-system 10. In addition, since the following description will be made mainly with respect to data transmission from the end-system 10 to the end-system 20, the end-systems will be suitably referred to as a source 10 and a destination 20, respectively.

With reference to FIG. 1 and the flow chart of FIGS. 2, 3, 4, operation of the embodiment of the present invention will be described in detail.

Figure 3:
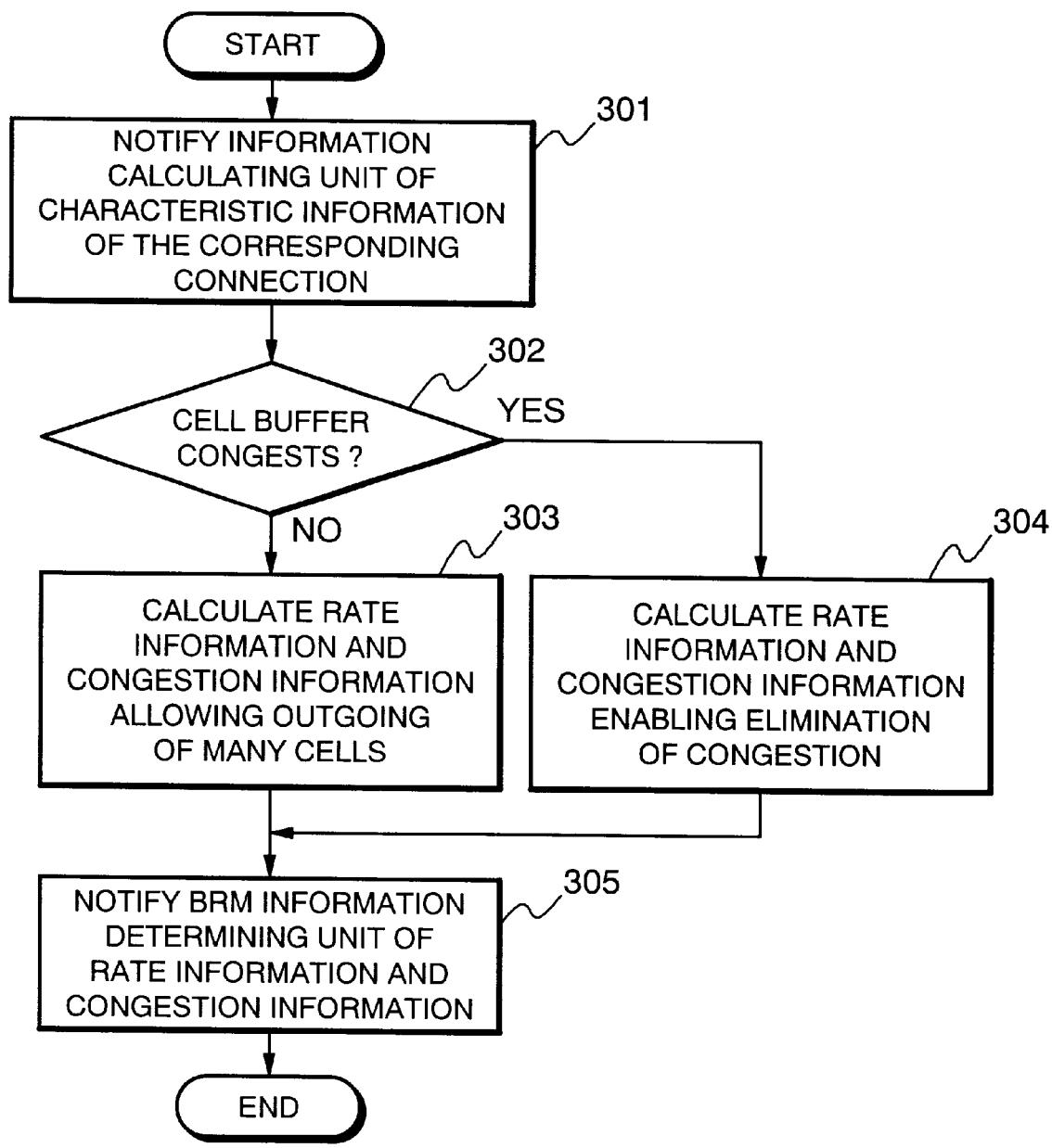
FIG. 3 is a flow chart showing operation of a buffer unit of the present embodiment.
Figure 4:
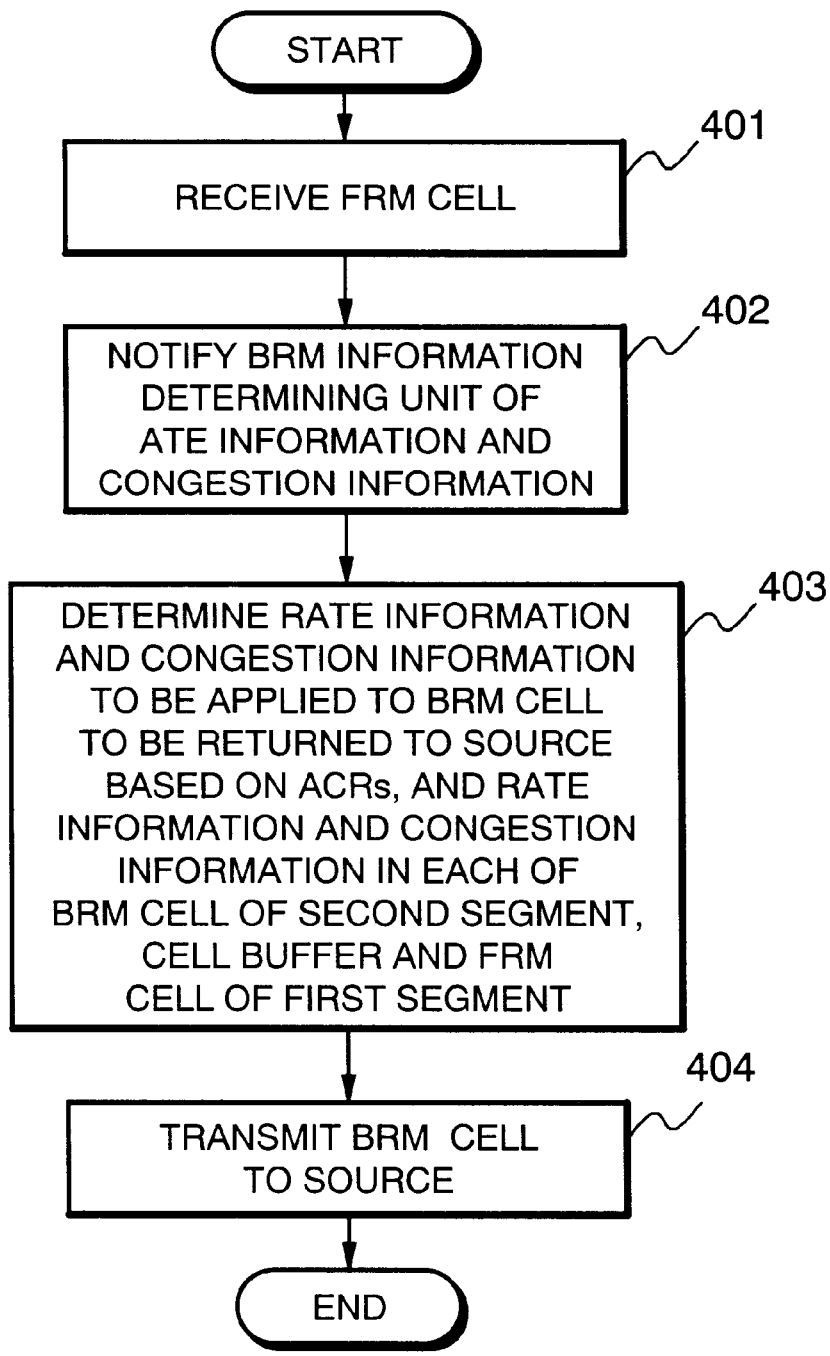
FIG. 4 is a flow chart showing operation of a VS module and a VD module on the side of a first segment of the present embodiment.
Figure 5:
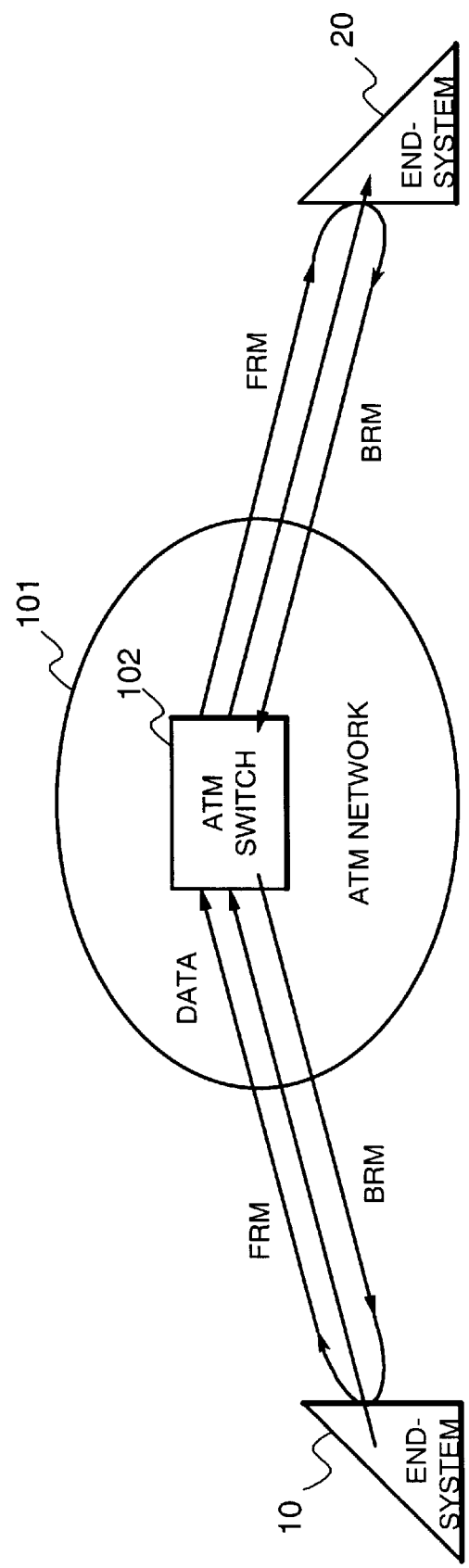
FIG. 5 is a block diagram showing concept of a conventional ATM network associated with ABR service.
Figure 6:
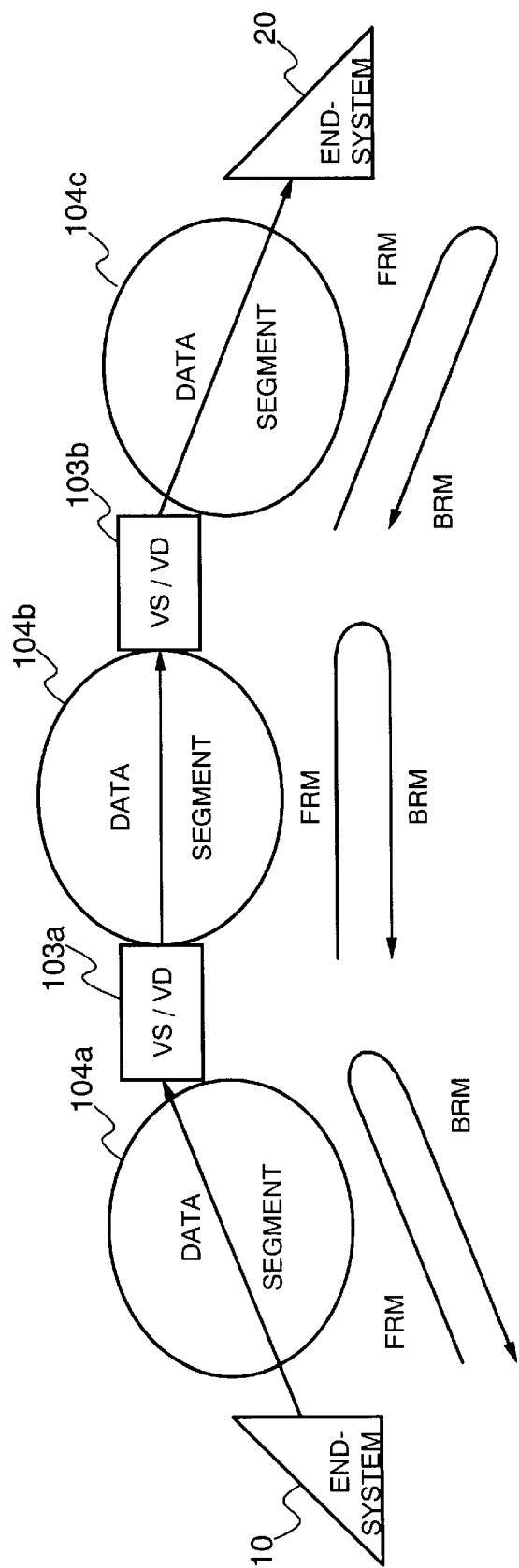
FIG. 6 is a block diagram showing one example of an ATM network associated with ABR service using conventional virtual source/virtual destination device.

Operation of the present embodiment is roughly divided into operation of the VD module 50b and the VS module 60b on the downstream second segment side (FIG. 2), operation of the buffer unit 40 (FIG. 3) and operation of the VD module 50a and the VS module 60a on the upstream first segment side (FIG. 4). In the following description, no description of a common behavior recited in the above-described literature "ATM Forum Traffic Management Specification Version 4.0" will be made for any of the operation of the VD module 50b and the VS module 60b, that of the buffer 40 and that of the VD module 50a and the VS module 60a, and description will be made only of characteristic operation of the present embodiment for sending rate information and congestion information upstream.

Figure 2:
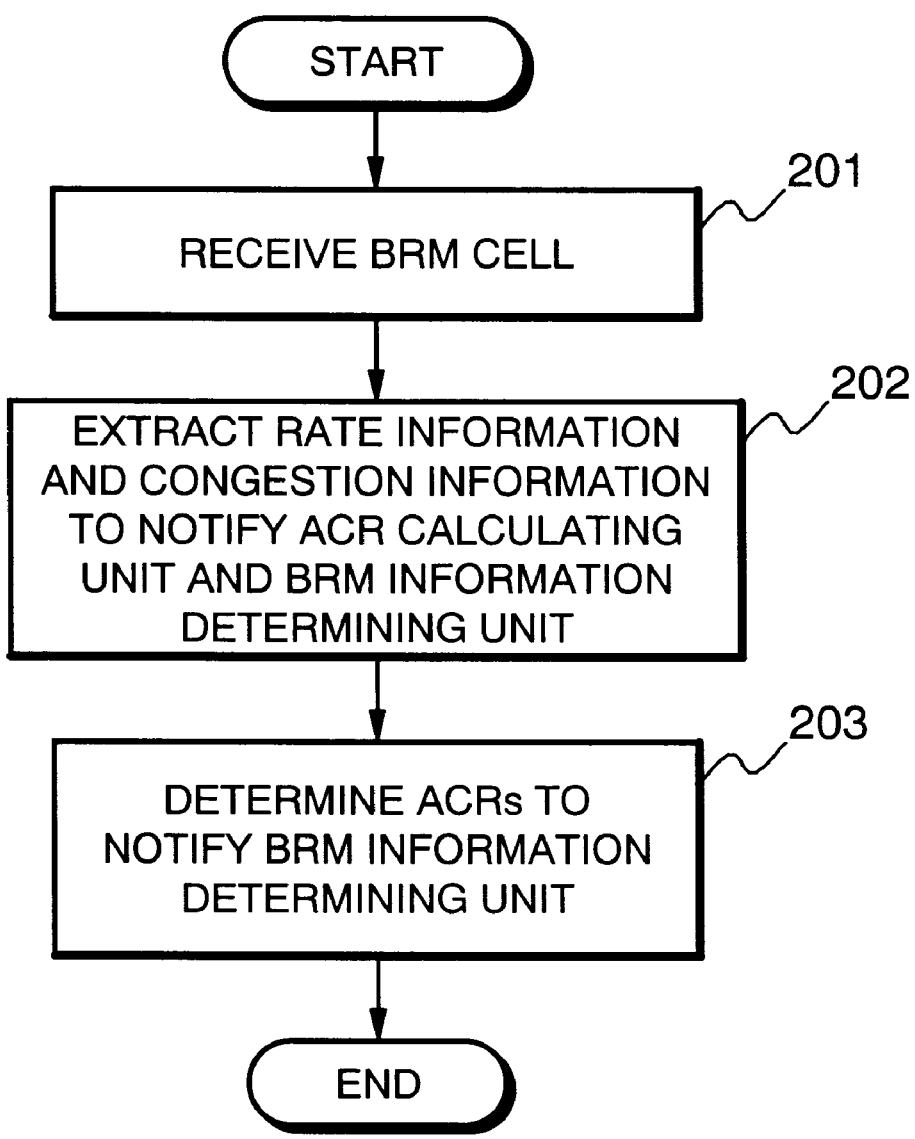
FIG. 2 is a flow chart showing operation of a VS module and a VD module on the side of a second segment of the present embodiment.

With reference to FIGS. 1 and 2, the VD module 50b receives a BRM cell on the downstream second segment side returned from the destination 20 to conduct termination processing including extraction of information in the cell (Step 201). The BRM information extracting unit 52 provided at the VD module 50b extracts rate information and congestion information in the received BRM cell. The unit 52 then notifies the ACR calculating unit 61 provided at the VS module 60b and the BRM information determining unit 51 provided at the VD module 50a on the side of the upstream first segment of the extracted rate information and congestion information (Step 202).

The ACR calculating unit 61 of the VS module 60b determines ACRs which is an ACR regarding cell outgoing from the VS module 60b based on the rate information and the congestion information received from the BRM information extracting unit 52. The unit 61 notifies the BRM information determining unit 51 of the VD module 50a of the determined ACRs (Step 203).

Next with reference to FIG. 1 and FIG. 3, the cell buffer 41 of the buffer unit 40 notifies the information calculating unit 42 of characteristic information of a connection corresponding to its stored data cell at predetermined timing (Step 301). The information calculating unit 42 determines a congestion state of the cell buffer 41 based on the connection characteristic information and a state of cells accumulated in the cell buffer 41 (Step 302) and when the cell buffer 41 is not congesting, the unit calculates rate information and congestion information allowing outgoing of many cells by the source 10 to notify the BRM information determining unit 51 (Steps 303 and 305). On the other hand, when the cell buffer is congesting, the unit 42 calculates rate information and congestion information enabling elimination of the congestion to notify the BRM information determining unit 51 (Steps 304 and 305).

Here, as timing of operation by the buffer unit 40, for example, upon arrival of a data cell from the first segment side, the cell buffer 41, on condition of this, may notify the information calculating unit 42 of characteristic information of the corresponding connection and the information calculating unit 42 may notify the BRM information determining unit 51 of the rate information and the congestion information, or the information calculating unit 42 may periodically observe the cell buffer 41 to obtain a cell accumulation state and receive characteristic information of the corresponding connection to notify the BRM information determining unit 51 of the rate information and the congestion information. In the operation on the condition of data cell arrival, acquisition of a data cell arrival rate by the information calculating unit 42 enables calculation of rate information. For periodical notification, periodic monitoring of a queue length of the cell buffer 41 by the information calculating unit 42 or counting of the number of data cells arriving in a fixed time period enables calculation of rate information.

Next, with reference to FIGS. 1 and 4, the VD module 50a receives an FRM cell on the upstream first segment side transmitted from the source 10 (Step 401) to notify the BRM information determining unit 51 of the rate information and the congestion information in the received FRM cell (Step 402).

The BRM information determining unit 51 provided at the VD module 50a determines rate information and congestion information applied to a BRM cell to be sent back from the VS module 60a to the source 10 based on the ACRs notified by the ACR calculating unit 61, the rate information and the congestion information in the BRM cell of the second segment notified by the BRM information extracting unit 52, the rate information and the congestion information notified by the information calculating unit 42, and the rate information and the congestion information in the FRM cell of the first segment received by the VD module 50a (Step 403). The VS module 60a applies the rate information and the congestion information determined by the BRM information determining unit 51 to a BRM cell and transmits the cell to the source 10 (Step 404).

The foregoing operation enables the source 10 to determine an ACR based on information reflecting the rate information and the congestion information at the second segment near the destination 20, the rate information and the congestion information obtained based on the state of the buffer unit 40 of the VS/VD 30, and the rate information and the congestion information in the first segment to which the source 10 belongs. As a result, the source 10 is allowed to directly seize not only the congestion state of the first segment to which it belongs, but also the congestion state of the buffer 40 of the VS/VD 30 and the congestion state of the second segment closer to the destination 20. While this embodiment is structured having one VS/VD 30 provided between the source 10 and the destination 20, the same effect can be obtained also with a plurality of VS/VDs 30 provided according to the structure of the ATM network and a line length.

Example of further detailed operation of the present embodiment will be described with reference to the drawings.

First, on the side of the second segment, the VD module 50b receives a BRM cell of the downstream second segment side returned from the destination 20 to conduct termination processing (FIG. 2, Step 201). Next, the BRM information extracting unit 52 extracts, from the received BRM cell, ERb which is an explicit rate, CIb which is a congestion indication bit and NIb which is a no increase bit, as rate information and congestion information. The unit 52 then notifies the ACR calculating unit 61 in the VS module 60b and the BRM information determining unit 51 in the VD module 50a of the extracted ERb, CIb and NIb (Step 202).

Next, the ACR calculating unit 61 determines ACRs which is an ACR regarding cell outgoing from the VS module 60b based on the ERb, CIb and NIb received from the BRM information extracting unit 52. The unit 61 also notifies the BRM information determining unit 51 in the VD module 50a of the determined ACRs (Step 203).

In addition, at the buffer unit 40, the cell buffer 41 notifies, based on an arriving data cell, the information calculating unit 42 of characteristic information of a connection corresponding to the cell, for example, a rate of the arriving cell (Steps 301 and 302). Then, the information calculating unit 42 determines a congestion state of the cell buffer 41 based on the connection characteristic information and a state of cell accumulated in the buffer (Step 303) and when the cell buffer is not congesting, the unit calculates an explicit rate ERq, a congestion indication bit CIq and a no increase bit NIq to indicate to the BRM information determining unit 51 so as to enable the source to send out many cells (Steps 304 and 306). On the other hand, when the cell buffer 41 is congesting, the unit 42 calculates ERq, CIq and NIq to indicate to the BRM information determining unit 51 so as to eliminate the congestion (Steps 305 and 306).

On the side of the first segment, the VD module 50a receives an FRM cell of the upstream first segment side transmitted from the source 10 (Step 401) and notifies the BRM information determining unit 51 of ERf which is an explicit rate, CIf which is a congestion indication bit and NIf which is a no increase bit as rate information and congestion information, out of the received FRM cell (Step 402).

Next, the BRM information determining unit 51 in the VD module 50a determines an explicit rate ERe to be applied to a BRM cell to be returned from the VS module 60a to the source 10 based on the ACRs notified by the ACR calculating unit 61, the ERb notified by the BRM information extracting unit 52, the ERq notified by the information calculating unit 42 and the ERf in the FRM cell of the first segment received by the VD module 50a according to the following expression (1) (Step 403).

$$ERe=\min(ACRs, ERb, ERq, ERf) \tag{1}$$

The BRM information determining unit 51 also determines a congestion indication bit CIe and a no rate increase bit NIe to be applied to the BRM cell to be returned from the VS module 60a to the source 10 based on the CIb and NIb notified by the BRM information extracting unit 52, the CIq and NIq notified by the information calculating unit 42, and the CIf and NIf in the FRM cell of the first segment received by the VD module 50a according to a logical sum of each bit as shown in the following expressions (2) and (3) (Step 403).

$$CIe=CIb+CIq+CIf \tag{2}$$

$$NIe=NIb+NIq+NIf \tag{3}$$

Next, the VS module 60a applies the determined ERe, CIe and NIe to the BRM cell and transmits the cell to the source 10 (Step 404).

After the foregoing operation, the source 10 determines an outgoing cell rate based on the information ERe, CIe and NIe reflecting the ERf, CIf and NIf in the first segment to which the source 10 belongs and the ACRs, ERb, CIb and NIb in the second segment near the destination 20. In other words, the source 10 is allowed to directly seize not only a congestion state of the first segment but also a congestion state of the second segment close to the destination 20 to control an outgoing cell rate.

Moreover, the source 10 determines an ACR based on the information ERe, CIe and NIe reflecting the ERq, CIq and NIq at the buffer unit 40 of the VS/VD 30 in addition to the above-described ACRs, ERb, CIb and NIb. In other words, the source 10 is allowed to directly seize not only a congestion state of each of the above-described segments but also a congestion state of the buffer 40 of the VS/VD 30 to control an outgoing cell rate.

Either information of each explicit rate notified to the BRM information determining unit 51 or of a pair of a congestion indication bit and a no rate increase bit may be used to determine part of the information of ERe, and CIe and NIe to indicate to the source 10. It is for example possible to use only each of the explicit rates to calculate ERe and indicate the calculated ERe to the source 10. Also possible is to use only a pair of a congestion indication bit and a no rate increase bit to determine a pair of CIe and NIe and indicate the pair to the source 10. In such cases, while unlike a case where all of the respective explicit rates, congestion indication bits and no increase bits are used, degradation of the performance can not be avoided, seize of a congestion state and control of an outgoing cell rate are possible.

The operation expression of ERe at the BRM information determining unit 51 shown at Step 403 of FIG. 4 may be changed from the above expression (1) to the following expression (4).

$$ERe=\min(\alpha ACRs, \beta ERb, ERq, ERf) \tag{4}$$

where the coefficient α is set to be a real value larger than "0" and less than "1" when the ACRs is decreased and set to be "1" when the ACRs is increased or not changed, and the coefficient β is set to be a real value larger than "0" and less than "1" when the ERb is decreased and set to be "1" when the ERb is increased or not changed.

When congestion occurs at the second segment, a rate at an outgoing line of the cell buffer 41 is ordinarily decreased at the VS module 60b to temporarily accumulate cells in the cell buffer 41. When rate information to be indicated to the source 10 is equal to an outgoing cell rate of the VS module 60b, such as ACRs, even if a data rate sent from the source 10 is modified, a rate of an incoming line and that of an outgoing line of the cell buffer 41 only equalize with each other and a queue of the cell buffer 41 is not eliminated.

Determining rate information to be indicated to the source 10 by using the above expression (4), however, allows the incoming line rate of the cell buffer 41 to be set lower than the outgoing line rate. This enables a queue of cells in the cell buffer 41 to be eliminated without fail by applying the ERe obtained by the above expression (4) to a BRM cell and returning the BRM cell to the source 10.

While the above description has been made assuming that the coefficients $\alpha$ and $\beta$ of the expression (4) are individually set, they may be set as a common variable.

In addition, modification of a variable of the operation expression (1) of ERe at the BRM information determining unit 51 shown at Step 403 of FIG. 4 may be conducted as follows.

When at the BRM information determining unit 41, a reduction rate of a newly indicated ERb to the last indicated ERb is higher than a preset fixed rate, that is, when the rate is drastically reduced, operation of rate information is conducted according to the expression (1) using the new ERb. On the other hand, when a reduction rate of the newly indicated ERb to the last indicated ERb is lower than the set value, that is, when a rate reduction is small, operation of the rate information is conducted without updating ERb in the expression (1). When the new ERb is increased to be more than the last ERb, operation of the rate information is conducted using the new ERb.

As described in the foregoing, when a rate reduction is small, absorbing a rate variation by the cell buffer 41 prevents excessive reduction of an outgoing cell rate of the source 10, thereby improving efficiency in use of a band of ABR.

While the above description has been made with respect to a rate modification in an ERb, the rate modification is also applicable to ACRs and ERq other than ERb to prevent excessive decrease of an outgoing cell rate of the source 10, thereby improving efficiency in use of a band of ABR. The above-described rate modification method may be applied not only to the above expression (1) but also to the expression (4).

Other method of determining application of the rate modification than the above method employs prediction based on information which has been arrived in the past. More specifically, not by determining a reduction rate of ERb at every reception of a BRM cell to reflect a rate variation on the operation expression (1) of ERe, but by comparing reduction rates of ERb at several previous BRM cells to reflect a rate variation on the operation expression (1), for example, when a sudden reduction is detected, excessive decrease of an outgoing cell rate of the source 10 can be further prevented to improve efficiency in use of a band of ABR.

In addition, forward protection and backward protection may be applied for determining CIe and NIe at the BRM information determining unit 51 shown at Step 403 of FIG. 4.

More specifically, parameters K and L of appropriate positive integers are preset. Then, when at the BRM information determining unit 51, CIb and NIb notified by the BRM information extracting unit 52 indicates more than or equal to K times in succession of congestion, the values of the CIb and NIb are operated in the expressions (2) and (3) as values indicative of congestion. When the CIb and NIb indicate not more than L times in succession of congestion, the values of the CIb and NIb are operated in the expressions (2) and (3) as values indicative of non-congestion.

Apart from the above-described parameters K and L, positive integral parameters M and N of appropriate positive integers are also preset. Then, when CIq and NIq notified by the information calculating unit 42 indicate more than or equal to M times in succession of congestion, the values of the CIq and NIq are operated in the expressions (2) and (3) as values indicative of congestion. When the CIq and NIq indicate not more than N times in succession of congestion, the values of the CIq and NIq are operated in the expressions (2) and (3) as values indicative of non-congestion.

As described in the foregoing, forward protection and backward protection against indication of CIb and NIb at the second segment and indication of CIq and Niq caused by the congestion of the buffer unit 40 prevent CI bit and NI bit temporarily notified by mistake from excessively decreasing an outgoing cell rate of the source 10, thereby improving efficiency in use of a band of ABR.

While the above description has been made with respect to a case where forward protection and backward protection are applied to the determination of CI and NI bits, forward protection and backward protection are also applicable to information of an explicit rate. Also in this case, it is possible to prevent the above-described excessive reduction of an outgoing cell rate of the source 10 due to erroneous operation to improve efficiency in use of a band of ABR.

As described in the foregoing, since the virtual source/virtual destination device of the present invention indicates downstream rate information and congestion information directly to the upstream side, it is possible to quickly notify the source of congestion occurring downstream in an ATM network to cope with the congestion by reducing an outgoing cell rate. This enables early elimination of congestion.

Another effect is to early eliminate congestion occurring at the virtual source/virtual destination device and in its surrounding by calculating and determining comprehensive rate information and congestion information to indicate to the source by using downstream rate information and congestion information, upstream rate information and congestion information, and rate information and congestion information at a cell buffer of its own device.

A further effect is to prevent sensitive modification of an outgoing cell rate of the source to improve efficiency in use of a band of an available bit rate by calculating and determining comprehensive rate information and congestion information to indicate to the source by using downstream rate information and congestion information, upstream rate information and congestion information, and rate information and congestion information at a cell buffer of its own device, and absorbing a minute rate variation by the above-described buffer.

In addition, when traffic of other service class such as CRB or VBR other than ABR exists in the same link, collecting and processing rate information and congestion information prevents or eliminates congestion of a cell buffer caused by variation in traffic of the service class.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. A virtual source/virtual destination device arranged between a source and a destination in an asynchronous transfer mode network where available bit rate service is provided, for dividing a closed loop control section between the source and the destination into a plurality of small closed loop control sections and virtually assuming a terminal behavior in each small closed loop control section to conduct termination processing of a resource management cell, comprising:

a destination side information extracting unit for extracting rate information and congestion information from a resource management cell transmitted in a closed loop control section on a destination side;

an information determining unit for determining rate information and congestion information to be notified to a closed loop control section on a source side based on said rate information and said congestion information at the closed loop control section on said destination side extracted by said destination side information extracting unit;

a writing unit for writing said rate information and said congestion information determined by said information determining unit to a resource management cell to be sent to the closed loop control section on said source side; and an own device information obtaining unit for obtaining rate information and congestion information at an own device regarding a data cell received from the closed loop control section on said source side, wherein said information determining unit determines rate information and congestion information to be indicated to the closed loop control section on said source side based on said rate information and said congestion information in the closed loop control section on said destination side extracted by said destination side information extracting unit and the rate information and the congestion information at the own device obtained by said own device information obtaining unit.

2. A virtual source/virtual destination device arranged between a source and a destination in an asynchronous transfer mode network where available bit rate service is provided, for dividing a closed loop control section between the source and the destination into a plurality of small closed loop control sections and virtually assuming a terminal behavior in each small closed loop control section to conduct termination processing of a resource management cell, comprising:

a destination side information extracting unit for extracting rate information and congestion information from a resource management cell transmitted in a closed loop control section on a destination side;

an information determining unit for determining rate information and congestion information to be notified to a closed loop control section on a source side based on said rate information and said congestion information at the closed loop control section on said destination side extracted by said destination side information extracting unit;

a writing unit for writing said rate information and said congestion information determined by said information determining unit to a resource management cell to be sent to the closed loop control section on said source side;

a source side information extracting unit for extracting rate information and congestion information from a resource management cell transmitted in the closed loop control section on said source side, and an own device information obtaining unit for obtaining rate information and congestion information at an own device regarding a data cell received from the closed loop control section on said source side, wherein said information determining unit determines rate information and congestion information to be indicated to the closed loop control section on said source side based on said rate information and said congestion information in the closed loop control section on said destination side extracted by said destination side information extracting unit, said rate information and said congestion information in the closed loop control section on said source side extracted by said source side information extracting unit, and the rate information and the congestion information at the own device obtained by said own device information obtaining unit.

3. A virtual source/virtual destination device arranged between a source and a destination in an asynchronous transfer mode network where available bit rate service is provided, for dividing a closed loop control section between the source and the destination into a plurality of small closed loop control sections and virtually assuming a terminal behavior in each small closed loop control section to conduct termination processing of a resource management cell, comprising:

a destination side information extracting unit for extracting rate information and congestion information from a resource management cell transmitted in a closed loop control section on a destination side;

an information determining unit for determining rate information and congestion information to be notified to a closed loop control section on a source side based on said rate information and said congestion information at the closed loop control section on said destination side extracted by said destination side information extracting unit;

a writing unit for writing said rate information and said congestion information determined by said information determining unit to a resource management cell to be sent to the closed loop control section on said source side; and an own device information obtaining unit for obtaining rate information and congestion information at an own device regarding a data cell received from the closed loop control section on said source side, wherein said information determining unit
compares rate information regarding an arrival rate of a data cell at the own device referred to for determining rate information with rate information regarding an arrival rate of a data cell at the own device referred to at the time of the last determination of rate information, when the value of said rate information is reduced and a reduction rate is higher than a preset value, determines rate information based on a present value of said rate information in the closed loop control section on said destination side, when the value of said rate information is reduced and reduction rate is lower than the preset value, determines rate information based on said rate information in the closed loop control section on said destination side referred to at the time of the last determination of rate information, and when the value of said rate information is increased, determines rate information based on the present value of said rate information in the closed loop control section on said destination side.

4. A virtual source/virtual destination device arranged between a source and a destination in an asynchronous transfer mode network where available bit rate service is provided, for dividing a closed loop control section between the source and the destination into a plurality of small closed loop control sections and virtually assuming a terminal behavior in each small closed loop control section to conduct termination processing of a resource management cell, comprising:

a destination side information extracting unit for extracting rate information and congestion information from a resource management cell transmitted in a closed loop control section on a destination side;

an information determining unit for determining rate information and congestion information to be notified to a closed loop control section on a source side based on said rate information and said congestion information at the closed loop control section on said destination side extracted by said destination side information extracting unit;

a writing unit for writing said rate information and said congestion information determined by said information determining unit to a resource management cell to be sent to the closed loop control section on said source side; and an own device information obtaining unit for obtaining rate information and congestion information at an own device regarding a data cell received from the closed loop control section on said source side, wherein said information determining unit
when said congestion information at the own device indicates a congestion state for a preset number of times in succession, sets congestion information to be notified to the closed loop control section on said source side to have the contents indicative of the congestion state, and
when said congestion information at the own device indicates a non-congestion state for a preset number of time in succession, sets congestion information to be notified to the closed loop control section on said source side to have the contents indicative of the non-congestion state.

5. A virtual source/virtual destination device arranged between a source and a destination in an asynchronous transfer mode network where available bit rate service is provided, for dividing a closed loop control section between the source and the destination into a plurality of small closed loop control sections and virtually assuming a terminal behavior in each small closed loop control section to conduct termination processing of a resource management cell, comprising:

a destination side information extracting unit for extracting rate information from a resource management cell transmitted in a closed loop control section on a destination side;

an information determining unit for determining rate information to be notified to a closed loop control section on a source side based on said rate information in the closed loop control section on said destination side extracted by said destination side information extracting unit;

a writing unit for writing said rate information determined by said information determining unit to a resource management cell to be sent to the closed loop control section on said source side; and an own device information obtaining unit for obtaining rate information at an own device regarding a data cell received from the closed loop control section on said source side, wherein said information determining unit determines rate information to be notified to the closed loop control section on said source side based on said rate information in the closed loop control section on said destination side extracted by said destination side information extracting unit and the rate information at the own device obtained by said own device information obtaining unit.

6. A virtual source/virtual destination device arranged between a source and a destination in an asynchronous transfer mode network where available bit rate service is provided, for dividing a closed loop control section between the source and the destination into a plurality of small closed loop control sections and virtually assuming a terminal behavior in each small closed loop control section to conduct termination processing of a resource management cell, comprising:

a destination side information extracting unit for extracting rate information from a resource management cell transmitted in a closed loop control section on a destination side;

an information determining unit for determining rate information to be notified to a closed loop control section on a source side based on said rate information in the closed loop control section on said destination side extracted by said destination side information extracting unit;

a writing unit for writing said rate information determined by said information determining unit to a resource management cell to be sent to the closed loop control section on said source side;

a source side information extracting unit for extracting rate information from a resource management cell transmitted in the closed loop control section on said source side, and an own device information obtaining unit for obtaining rate information at an own device regarding a data cell received from the closed loop control section on said source side, wherein said information determining unit determines rate information to be notified to the closed loop control section on said source side based on said rate information in the closed loop control section on said destination side extracted by said destination side information extracting unit, said rate information in the closed loop control section on said source side extracted by said source side information extracting unit, and the rate information at the own device obtained by said own device information obtaining unit.

7. A virtual source/virtual destination device arranged between a source and a destination in an asynchronous transfer mode network where available bit rate service is provided, for dividing a closed loop control section between the source and the destination into a plurality of small closed loop control sections and virtually assuming a terminal behavior in each small closed loop control section to conduct termination processing of a resource management cell, comprising:

a destination side information extracting unit for extracting congestion information from a resource management cell transmitted in a closed loop control section on a destination side;

an information determining unit for determining congestion information to be notified to a closed loop control section on said source side based on said congestion information at the closed loop control section on said destination side extracted by said destination side information extracting unit;

a writing unit for writing said congestion information determined by said information determining unit to a resource management cell to be sent to the closed loop control section on said source side, and an own device information obtaining unit for obtaining congestion information at an own device regarding a data cell received from the closed loop control section on said source side, wherein said information determining unit determines congestion information to be notified to the closed loop control section on said source side based on said congestion information in the closed loop control section on said destination side extracted by said destination side information extracting unit and the congestion information at the own device obtained by said own device information obtaining unit.

8. A virtual source/virtual destination device arranged between a source and a destination in an asynchronous transfer mode network where available bit rate service is provided, for dividing a closed loop control section between the source and the destination into a plurality of small closed loop control sections and virtually assuming a terminal behavior in each small closed loop control section to conduct termination processing of a resource management cell, comprising:

a destination side information extracting unit for extracting congestion information from a resource management cell transmitted in a closed loop control section on a destination side;

an information determining unit for determining congestion information to be notified to a closed loop control section on said source side based on said congestion information at the closed loop control section on said destination side extracted by said destination side information extracting unit;

a writing unit for writing said congestion information determined by said information determining unit to a resource management cell to be sent to the closed loop control section on said source side;

a source side information extracting unit for extracting congestion information from a resource management cell transmitted in the closed loop control section on said source side, and an own device information obtaining unit for obtaining congestion information at an own device regarding a data cell received from the closed loop control section on said source side, wherein said information determining unit determines congestion information to be notified to the closed loop control section on said source side based on said congestion information in the closed loop control section on said destination side extracted by said destination side information extracting unit, said congestion information in the closed loop control section on said source side extracted by said source side information extracting unit, and the congestion information at the own device obtained by said own device information obtaining unit.

* * * * *